US011014669B2

(12) United States Patent
LeGrand et al.

(10) Patent No.: US 11,014,669 B2
(45) Date of Patent: May 25, 2021

(54) SIX DEGREE OF FREEDOM AERIAL VEHICLE HAVING PIVOTING WING SECTIONS

(71) Applicant: Amazon Technologies, Inc., Seattle, WA (US)

(72) Inventors: Louis LeGrand, Seattle, WA (US); Omri Rand, Seattle, WA (US); Ricky Welsh, Seattle, WA (US); Gur Kimchi, Seattle, WA (US); Sebastian Fischer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 16/133,609

(22) Filed: Sep. 17, 2018

(65) Prior Publication Data

US 2020/0086986 A1  Mar. 19, 2020

(51) Int. Cl.
*B64C 11/46* (2006.01)
*B64C 29/02* (2006.01)
(Continued)

(52) U.S. Cl.
CPC ............ *B64C 39/024* (2013.01); *B64C 11/46* (2013.01); *B64C 29/02* (2013.01); *B64C 39/062* (2013.01); *B64C 2201/042* (2013.01); *B64C 2201/104* (2013.01); *B64C 2201/128* (2013.01); *B64C 2201/165* (2013.01)

(58) Field of Classification Search
CPC ........ B64C 29/02; B64C 39/06; B64C 39/062
See application file for complete search history.

(56) References Cited

U.S. PATENT DOCUMENTS 2,952,422 A    9/1960  Fletcher et al.
3,350,035 A   10/1967  Schlieben
(Continued)

FOREIGN PATENT DOCUMENTS

CA      2967228 A1   11/2017
CN    103625640 A    3/2014
(Continued)

OTHER PUBLICATIONS

Andrew Rosenblum et al, "The Jets of the Future," May 1, 2012, Retrieved from the Internet on Mar. 27, 2018: URL: https://www.popsci.com/technology/article/2012-04/jets-future, pp. 1-9.
(Continued)

*Primary Examiner* — Joseph W Sanderson
(74) *Attorney, Agent, or Firm* — Athorus, PLLC

(57) ABSTRACT

Systems and methods to improve stability and control of an aerial vehicle are described. For an aerial vehicle having a ring wing around a fuselage and a plurality of propulsion mechanisms, one or more sections of the ring wing may be pivotable to reduce vibrations and forces transferred to the aerial vehicle, and to prevent stall and minimize turbulence experienced by the aerial vehicle. The pivotable sections of the ring wing may be freely pivotable, may include locking elements to prevent or allow pivoting, may include bias elements or dampening elements to partially control the free pivoting, or may include actuators to effect desired pivoting.

18 Claims, 10 Drawing Sheets

(51) Int. Cl.
*B64C 39/06* (2006.01)
*B64C 39/02* (2006.01)

(56) References Cited

U.S. PATENT DOCUMENTS

| | | | | |
|---|---|---|---|---|
| 4,280,673 | A * | 7/1981 | Brzack | B64C 39/062 244/13 |
| 4,345,401 | A * | 8/1982 | Brzack | A63H 27/00 244/13 |
| 7,988,088 | B2 * | 8/2011 | Konstantinovskiy | B64C 3/54 244/12.6 |
| 8,262,016 | B2 * | 9/2012 | Gosling | B64C 39/062 244/12.2 |
| 9,481,457 | B2 | 11/2016 | Alber | |
| 9,499,266 | B1 | 11/2016 | Garreau | |
| 9,550,567 | B1 | 1/2017 | Erdozain et al. | |
| 9,821,909 | B2 | 11/2017 | Moshe | |
| 10,059,442 | B2 | 8/2018 | Olm et al. | |
| 10,252,796 | B2 * | 4/2019 | Reichert | B64C 39/062 |
| 10,414,483 | B2 | 9/2019 | Ivans et al. | |
| 10,518,880 | B2 * | 12/2019 | Kimchi | B64C 27/26 |
| 10,556,680 | B2 * | 2/2020 | Fenny | B64C 29/0025 |
| 10,676,183 | B2 * | 6/2020 | Fenny | B64C 3/16 |
| 10,723,453 | B2 | 7/2020 | Scott et al. | |
| 10,730,624 | B2 * | 8/2020 | Fenny | B64C 3/16 |
| 10,737,786 | B2 * | 8/2020 | Fenny | B64D 27/24 |
| 2007/0023581 | A1 | 2/2007 | La | |
| 2007/0215746 | A1 | 9/2007 | Rieken et al. | |
| 2008/0087763 | A1 * | 4/2008 | Sheahan, Jr. | B64C 3/56 244/49 |
| 2009/0302150 | A1 * | 12/2009 | Konstantinovskiy | B64F 1/10 244/15 |
| 2010/0044496 | A1 * | 2/2010 | Gosling | B64C 39/062 244/12.5 |
| 2011/0042509 | A1 | 2/2011 | Bevirt et al. | |
| 2012/0248259 | A1 | 10/2012 | Page et al. | |
| 2013/0206915 | A1 | 8/2013 | Desaulniers | |
| 2016/0016652 | A1 * | 1/2016 | Barrett | A63H 33/003 244/15 |
| 2016/0355260 | A1 * | 12/2016 | Herber | B64D 27/24 |
| 2017/0057630 | A1 | 3/2017 | Schwaiger | |
| 2017/0313433 | A1 | 11/2017 | Ozaki | |
| 2018/0002011 | A1 | 1/2018 | McCullough et al. | |
| 2018/0155011 | A1 | 6/2018 | Greiner et al. | |
| 2018/0186445 | A1 * | 7/2018 | Fenny | B64C 3/10 |
| 2018/0215462 | A1 * | 8/2018 | Fenny | B64C 29/02 |
| 2018/0229839 | A1 | 8/2018 | Kimchi et al. | |
| 2018/0244364 | A1 * | 8/2018 | Fenny | B64C 39/024 |
| 2018/0244376 | A1 * | 8/2018 | Fenny | B64C 29/0025 |
| 2018/0244381 | A1 * | 8/2018 | Fenny | B64C 1/068 |
| 2018/0290736 | A1 * | 10/2018 | Mikic | B64C 27/52 |
| 2020/0070972 | A1 * | 3/2020 | Fischer | B64C 39/062 |
| 2020/0081432 | A1 * | 3/2020 | Szmuk | B64C 11/46 |
| 2020/0086984 | A1 * | 3/2020 | LeGrand | B64C 27/20 |
| 2020/0086985 | A1 * | 3/2020 | LeGrand | B64C 39/024 |
| 2020/0089227 | A1 * | 3/2020 | LeGrand | B64C 11/46 |
| 2020/0094961 | A1 * | 3/2020 | Kimchi | B64C 39/024 |
| 2020/0148354 | A1 * | 5/2020 | Morris | B64C 39/06 |
| 2020/0239150 | A1 * | 7/2020 | Kimchi | B64D 29/06 |

FOREIGN PATENT DOCUMENTS

| | | | | |
|---|---|---|---|---|
| DE | 102009033821 | A1 | | 1/2011 |
| EP | 1775214 | A1 | | 4/2007 |
| FR | 3049575 | A1 * | 10/2017 | ........... B64C 39/062 |
| GB | 2462452 | B | | 2/2011 |
| WO | 2001030652 | A1 | | 5/2001 |
| WO | 2010015866 | A2 | | 2/2010 |
| WO | 2011131733 | A2 | | 10/2011 |
| WO | 2015150529 | A1 | | 10/2015 |
| WO | 2016089882 | A1 | | 6/2016 |

OTHER PUBLICATIONS

Dirtflare, "Ring Wing VTOL!!!," Specifications Ring Wing VTOL!!!, Aug. 1, 2016, Retrieved from the Internet on Mar. 22, 2018: URL: https://www.simpleplanes.com/a/Mo2vSy/Ring-Wing-VTOL, pp. 1-2.

International Search Report & Written Opinion dated Dec. 12, 2019, in corresponding International Application No. PCT/US2019/050831, 15 pages.

* cited by examiner

SIX DEGREE OF FREEDOM AERIAL VEHICLE HAVING PIVOTING WING SECTIONS

CROSS-REFERENCE TO RELATED APPLICATION

This application is related to U.S. application Ser. No. 15/435,121, filed Feb. 16, 2017, entitled "Six Degree of Freedom Aerial Vehicle with a Ring Wing," which is incorporated herein by reference in its entirety.

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. While there are many beneficial uses of these vehicles, balancing the tightly coupled vehicle performance parameters of stability, maneuverability, and energy efficiency introduces design complexities of the UAVs. For example, due to current design limitations, design tradeoffs exist between optimizing UAVs for high agility versus high energy efficiency. In addition, aerial vehicles may be designed primarily for either horizontal flight or VTOL flight orientations. Accordingly, there is a need for systems and methods to improve stability and efficiency of aerial vehicles in both horizontal flight and VTOL flight orientations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
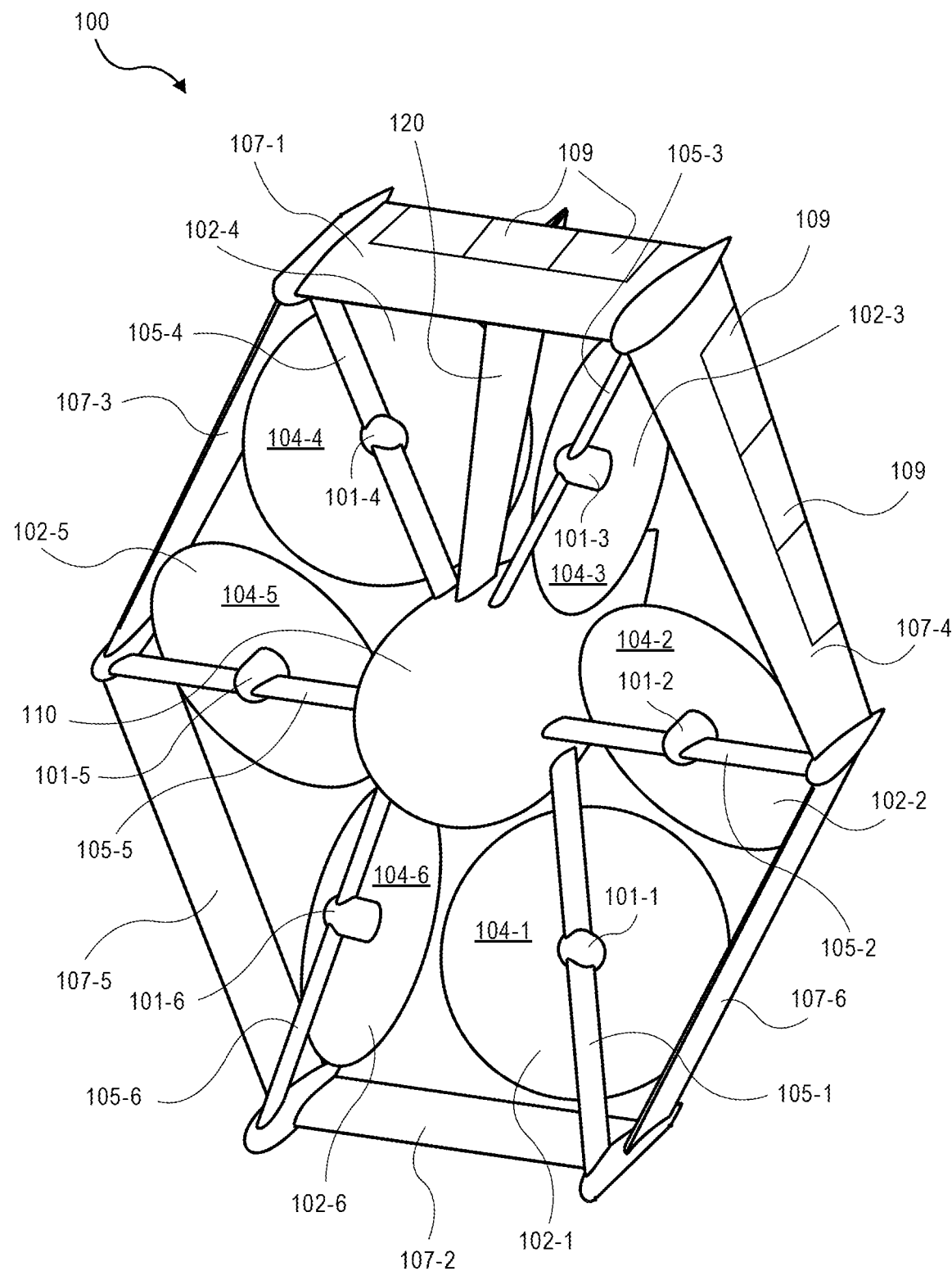
FIGS. 1-5 illustrate various views of an aerial vehicle with a substantially hexagonal shaped ring wing, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes aerial vehicles, such as UAVs (e.g., quad-copters, hex-copters, hepta-copters, octa-copters) that can operate in a vertical takeoff and landing (VTOL) orientation or in a horizontal flight orientation. Likewise, when the aerial vehicle is in a VTOL orientation, it can transition independently in any of the six degrees of freedom. Specifically, as described herein, the aerial vehicles may efficiently rotate in any of the three degrees of freedom of rotation (pitch, yaw, and roll) and/or may efficiently move in any of the three degrees of freedom of translation (surge, heave, and sway). For example, the aerial vehicle may include six propulsion mechanisms that are oriented at different angles and therefore, together, can provide thrust in the vertical direction and/or the horizontal direction when the aerial vehicle is in a VTOL orientation.

As discussed further below, a ring wing is included on the aerial vehicle that surrounds the propulsion mechanisms of the aerial vehicle and provides both protection around the propulsion mechanisms and lift when the aerial vehicle is in the horizontal flight orientation and navigating in a substantially horizontal direction.

In addition, the ring wing may include one or more wing sections that are pivotable relative to a remainder of the ring wing. A pivotable wing section may pivot about a pivot axis that extends substantially parallel to a span of the wing section. In some example embodiments, a pivotable wing section may be freely pivotable based at least in part on airflow around the wing section, e.g., to reduce vibrations or forces experienced by the aerial vehicle as a result of airflow or air resistance, and/or to prevent stall or minimize turbulence during operation. In other example embodiments, a pivotable wing section may include a bias element to bias the wing section toward a nominal or home position, and/or a pivotable wing section may include a dampening element to control or slow movement of the wing section, e.g., to prevent continuous or rapid movement or oscillation.

In further example embodiments, a pivotable wing section may including a locking element that may either hold or prevent pivoting of the wing section, or release or allow pivoting of the wing section. The locking or unlocking of a pivotable wing section may be based on various factors, such as aerial vehicle orientation (e.g., horizontal flight orientation or VTOL flight orientation), environmental factors (e.g., wind, gusts, temperature, pressure, precipitation, or others), operating parameters of the aerial vehicle (e.g., speed, altitude, weight, power, range, vibration, flight plan, or others), location factors (e.g., urban, rural, densely populated, sparsely populated, potential obstacles, people, or objects, acceptable noise level, or others), and/or various other factors. Various types of locking elements may be used, such as clutches, switches, bias elements, servos, solenoids, linear actuators, rotary actuators, piezoelectric actuators, magnetic actuators, or combinations thereof.

In still further example embodiments, a pivotable wing section may include an actuator that may actively modify an orientation of the wing section. The orientation of the wing section may be modified based on various factors, such as those described herein, including aerial vehicle orientation, environmental factors, operating parameters of the aerial vehicle, location factors, or various other factors. Various types of actuators may be used, such as servos, solenoids, motors, screw actuators, geared actuators, magnetic actuators, linear actuators, rotary actuators, or combinations thereof.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

FIG. 1 illustrates a view of an aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. As discussed above, while the propulsion mechanisms 102 may include motors 101-1, 101-2, 101-3, 101-4, 101-5, and 101-6 and propellers 104-1, 104-2, 104-3, 104-4, 104-5, and 104-6, in other implementations, other forms of propulsion may be utilized as the propulsion mechanisms 102. For example, one or more of the propulsion mechanisms 102 of the aerial vehicle 100 may utilize fans, jets, turbojets, turbo fans, jet engines, and/or the like to maneuver the aerial vehicle. Generally described, a propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween).

Likewise, while the examples herein describe the propulsion mechanisms being able to generate force in either direction, in some implementations, the propulsion mechanisms may only generate force in a single direction. However, the orientation of the propulsion mechanisms may be adjusted so that the force can be oriented in a positive direction, a negative direction, and/or any other direction.

In this implementation, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, and discussed further below, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the motor arm extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, plastics, metals, aluminum, steel, other materials, or combinations thereof.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other embodiments, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanism 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
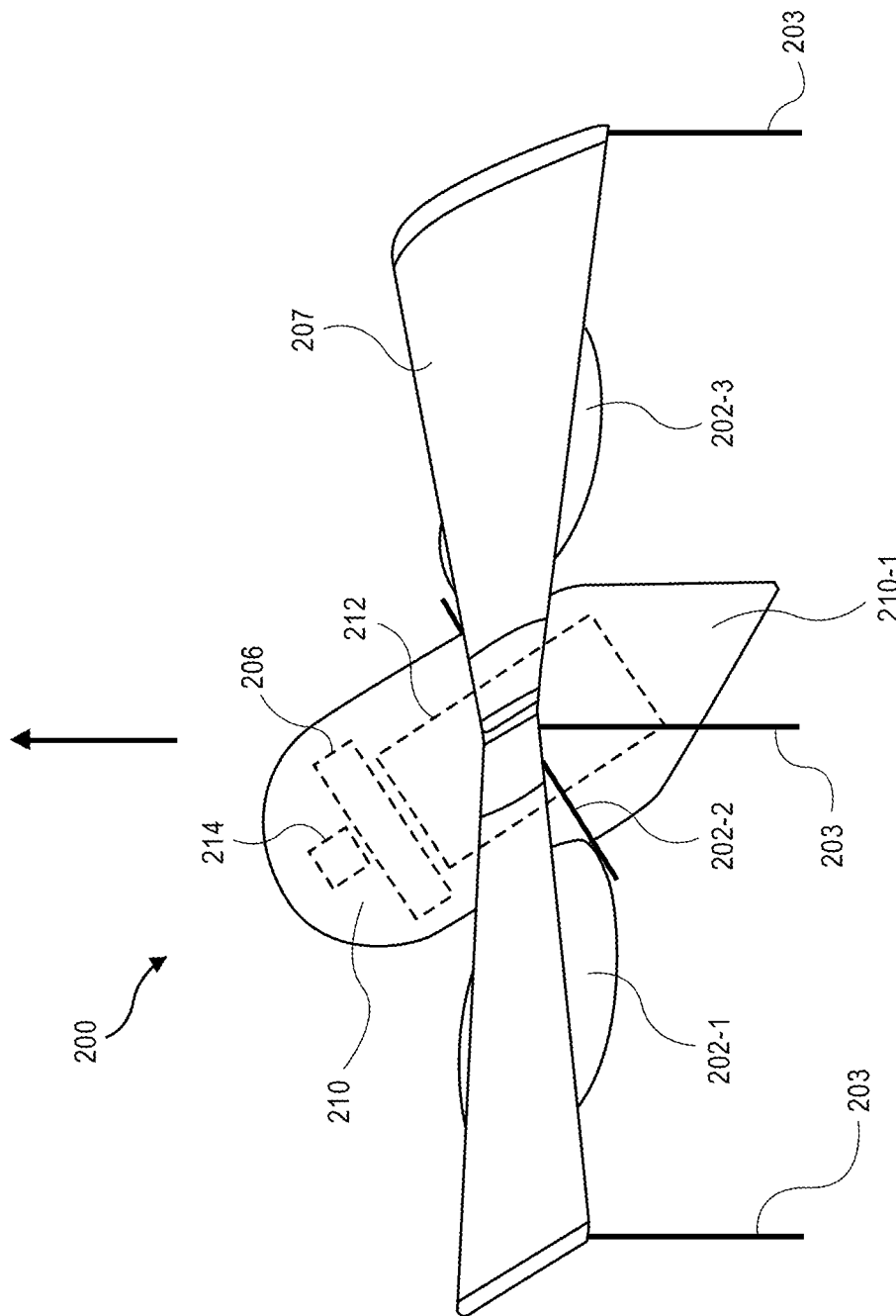

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. The aerial vehicle control system 214 is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
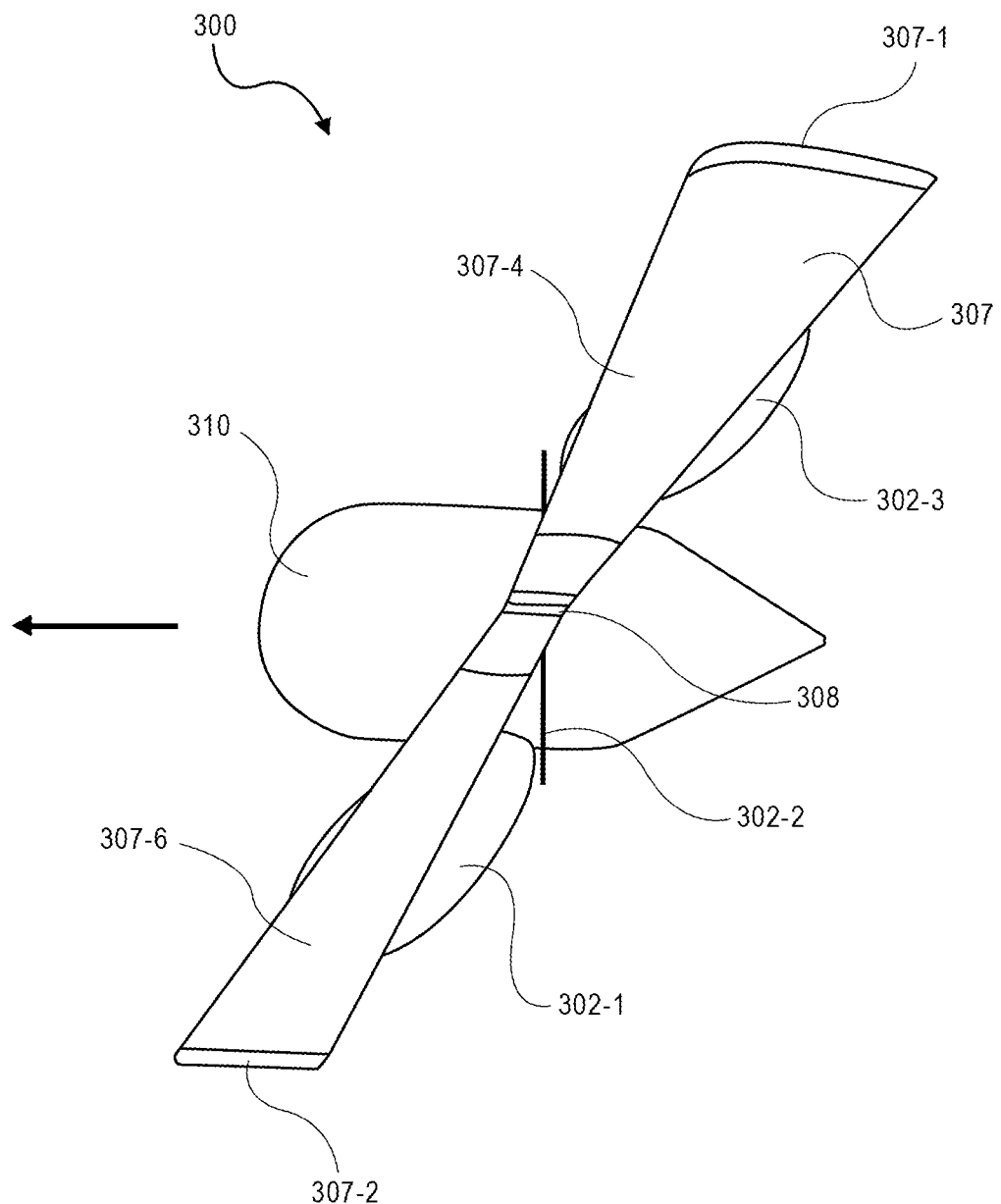

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanism 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower segment 307-2 of the ring wing is positioned ahead of the upper segment 307-1 of the ring wing 307. The leading wing, lower segment 307-2 produces a much higher lift per square inch than the rear wing, upper segment 307-1, and the chord length of the lower segment 307-2 is less than the chord length of the upper segment 307-1. Likewise, as illustrated, the upper segment 307-1 of the ring wing has a different camber than the lower segment 307-2. The chord length and camber transition from that illustrated along the upper segment 307-1 to the lower segment 307-2. In implementations that include one or more stabilizer fins, such as stabilizer fin 120 (FIG. 1), the difference between the chord lengths of the lower segment 307-2 and the upper segment 307-1 may be less and/or the difference between the cambers of the lower segment 307-2 and the upper segment 307-1 may be less.

While the side segments, such as side segment 307-4 and segment 307-6 of the ring wing provide some lift, at the midpoint 308 of each side segment there is minimal lift produced by the ring wing 307. Because there is minimal lift produced at the midpoint 308, the segments may be tapered to reduce the overall weight of the aerial vehicle. In this example, the side segments, such as side segments 307-4 and 307-6, are tapered toward the mid-point but retain some dimension for structural integrity and to operate as a protective barrier around the propulsion mechanisms 302. While the illustrated examples show both side segments 307-4 and 307-6 tapering to a smaller end at the midpoint 308, in other implementations, the taper may be consistent from the larger top segment 307-1 to the smaller lower segment 307-2.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
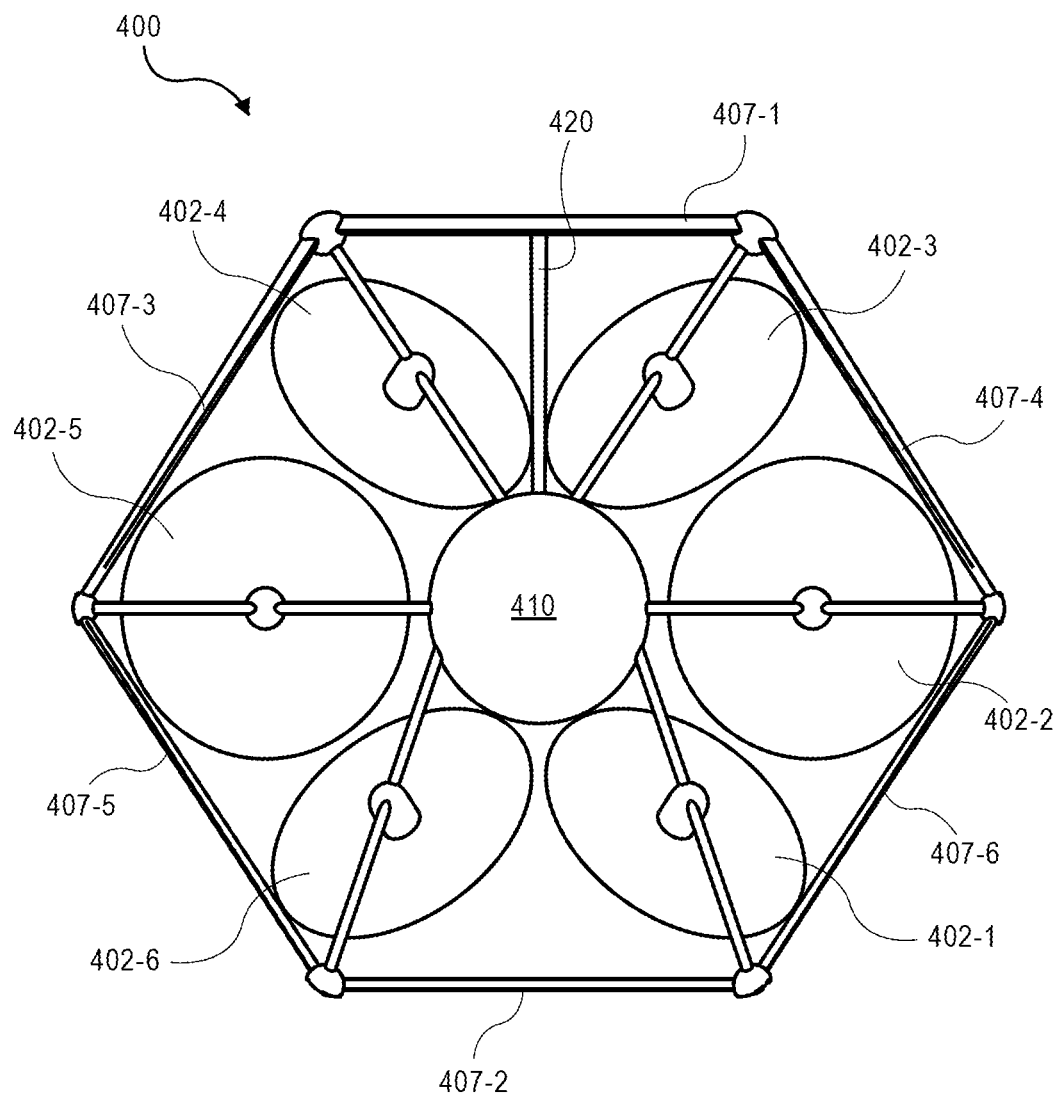

FIG. 4 is a front-on view of an aerial vehicle 400 with a ring wing 407 having a substantially hexagonal shape, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, one or more ailerons, such as those discussed above with respect to FIG. 1, may be included on the surface of the ring wing and used to control the aerial navigation of the aerial vehicle during horizontal flight. Likewise, one or more stabilizer fins 420 may be included to stabilize the aerial vehicle during horizontal flight.

In some implementations, the hexagonal shaped ring wing may decrease manufacturing costs, provide for more stable flight, and provide flatter surfaces upon which control elements, such as ailerons, may be included, in comparison to a ring wing having a substantially circular shape or various other shapes. Likewise, other components may be coupled to the surface of the ring wing. Other components include, but are not limited to, sensors, imaging elements, range finders, identifying markers, navigation components, such as global positioning satellite antennas, antennas, etc.

As discussed below, to transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5, oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

As discussed below, by orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, as discussed below, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

Figure 5:
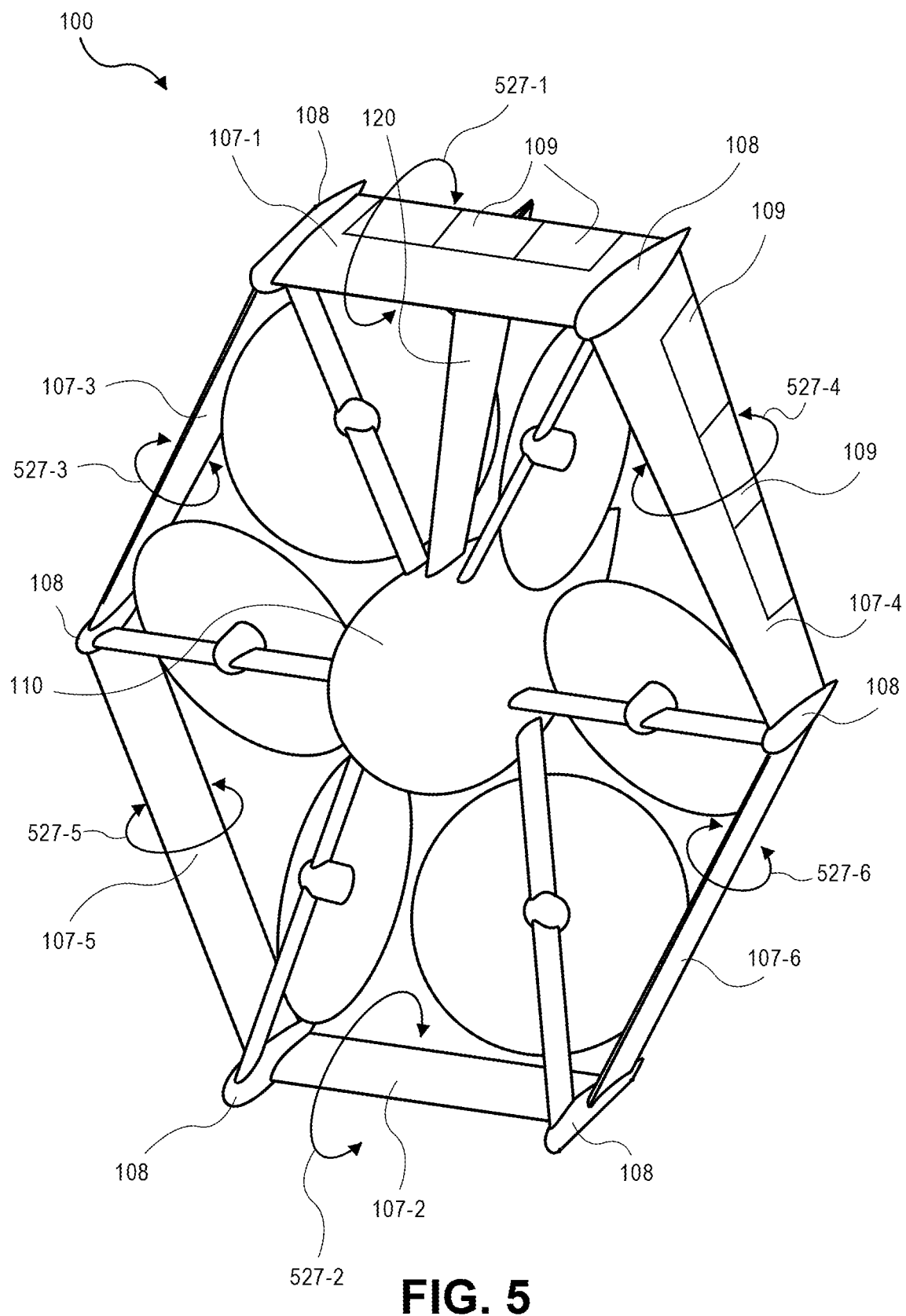

FIG. 5 illustrates another view of the aerial vehicle 100 illustrated in FIG. 1 with a ring wing that is substantially hexagonal in shape and that surrounds a plurality of propulsion mechanisms, according to disclosed implementations. The aerial vehicle 100 of FIG. 5 corresponds to aerial vehicle 100 of FIG. 1, aerial vehicle 200 of FIG. 2, aerial vehicle 300 of FIG. 3, and aerial vehicle 400 of FIG. 4.

As described herein, the ring wing 107 of the aerial vehicle 100 may include a plurality of wing sections 107-1, 107-2, 107-3, 107-4, 107-5, 107-6. In addition, each of the wing sections may be coupled or connected to adjacent wing sections via a joint 108, e.g., a pod, vessel, or other aerodynamically shaped component. As shown in FIG. 5, wing section 107-1 may be coupled to adjacent wing sections 107-3, 107-4 via respective joints 108. Likewise, wing section 107-2 may be coupled to adjacent wing sections 107-5, 107-6 via respective joints 108. Other wing sections may similarly be coupled to adjacent wing sections via respective joints 108.

Further, in example embodiments, one or more of the wing sections 107-1, 107-2, 107-3, 107-4, 107-5, 107-6 may be configured to pivot relative to a remainder of the ring wing 107, or relative to nominal or home positions of each wing section. For example, wing section 107-1 may pivot around a pivot axis extending substantially parallel to a span of wing section 107-1 between opposing joints 108 in directions indicated by arrow 527-1, wing section 107-2 may pivot around a pivot axis extending substantially parallel to a span of wing section 107-2 between opposing joints 108 in directions indicated by arrow 527-2, wing section 107-3 may pivot around a pivot axis extending substantially parallel to a span of wing section 107-3 between opposing joints 108 in directions indicated by arrow 527-3, wing section 107-4 may pivot around a pivot axis extending substantially parallel to a span of wing section 107-4 between opposing joints 108 in directions indicated by arrow 527-4, wing section 107-5 may pivot around a pivot axis extending substantially parallel to a span of wing section 107-5 between opposing joints 108 in directions indicated by arrow 527-5, wing section 107-6 may pivot around a pivot axis extending substantially parallel to a span of wing section 107-6 between opposing joints 108 in directions indicated by arrow 527-6.

In some example embodiments, only a subset of the wing sections may be configured to pivot, e.g., only upper and lower wing sections 107-1, 107-2 in a horizontal flight orientation may be configured to pivot relative to a remainder of the ring wing 107, or relative to nominal or home positions of each wing section. In other example embodiments, only one wing section, various combinations of two or more wing sections, or all wing sections may be configured to pivot relative to a remainder of the ring wing 107, or relative to nominal or home positions of each wing section.

By allowing one or more wing sections to pivot, e.g., freely pivot based at least in part on airflow around the wing sections, the wing sections may automatically, e.g., passively, actively, or combinations thereof, adjust their orientations based on the airflow, air resistance, or other environmental factors around the wing sections. As a result, vibrations or forces experienced by the aerial vehicle and various components of the aerial vehicle as a result of airflow or air resistance may be reduced or minimized. In addition, stall or turbulence conditions affecting the aerial vehicle during operation may be prevented or minimized.

While the examples discussed above in FIGS. 1-5 describe a ring wing having a substantially hexagonal shape, in other implementations, the ring wing may have other shapes. For example, the ring wing may be substantially circular, square, rectangular, pentagonal, octagonal, etc. Further, while the examples discussed above include six propulsion mechanism arms, six propulsion mechanisms, and six propellers, in other example embodiments, the aerial vehicle reconfigurations described herein may be implemented on various other types of aerial vehicles, such as aerial vehicles having fewer than six propulsion mechanism arms, motors, and propellers, aerial vehicles having greater than six propulsion mechanism arms, motors, and propellers, and/or aerial vehicles having configurations different from those described herein, such as quad-copters, octa-copters, or other configurations.

In addition, although FIG. 5 shows each of the wing sections coupled to adjacent wing sections via joints 108, in other example embodiments, one or more wing sections may be directly coupled to one or more adjacent wing sections, e.g., without intervening joints 108. Further, although FIG. 5 shows substantially an entire span of each wing section as being pivotable, in other example embodiments, less than an entire span of each wing section may be pivotable, and/or two or more portions of each wing section may be individually pivotable.

Figure 6:
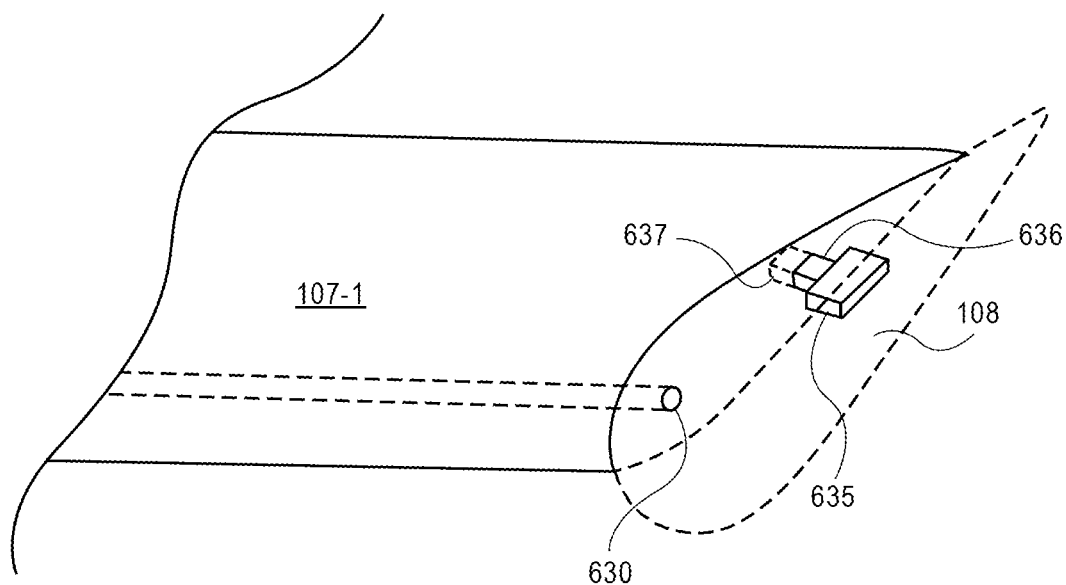
FIG. 6 illustrates a schematic, partial view of a pivoting wing section and an example locking element, in accordance with disclosed implementations.

FIG. 6 illustrates a schematic, partial view of a pivoting wing section 107-1 and an example locking element, in accordance with disclosed implementations.

As shown in FIG. 6, the pivoting wing section 107-1 may be pivotably coupled or connected to a joint 108. In addition, the wing section 107-1 may be pivotable about pivot axis 630. The pivot axis 630 may comprise a shaft, pin, or other element that facilitates pivoting or rotation of the wing section 107-1 relative to joint 108. The shaft or pin associated with pivot axis 630 may extend substantially parallel to a span of the wing section 107-1, and the shaft or pin may extend all or only a portion of the span of the wing section 107-1. Further, one or more bearings, rollers, lubricants, or other rotational elements may be associated with the shaft or pin at the pivot axis 630 to facilitate pivoting or rotation of the wing section 107-1.

In addition, a locking element 635 may be associated with wing section 107-1 to either hold or prevent pivoting of the wing section 107-1 relative to joint 108, or release or allow pivoting of the wing section 107-1 relative to joint 108. The locking element 635 may be located at least partially within joint 108 and interface with at least a portion of the wing section 107-1, and when locked by locking element 635, the wing section 107-1 may be held in a nominal (or home) position.

In one example embodiment, the locking element 635 may comprise a pin or key 636 that may be extended into or retracted from a hole, groove, or keyhole 637 associated with wing section 107-1 via an actuator, in order to prevent or allow pivoting of wing section 107-1. In another example embodiment, the locking element 635 may comprise a first magnetic or electromagnetic element 636 that interfaces with a second magnetic or electromagnetic element 637 associated with wing section 107-1, in order to prevent or allow pivoting of wing section 107-1. In a further example embodiment, the locking element 635 may comprise a frictional element 636 that interferes with another element 637 associated with wing section 107-1 or a portion of the wing section 107-1, in order to prevent or allow pivoting of wing section 107-1.

Further, the locking element 635 may comprise one or more actuators associated with wing section 107-1 to control locking or unlocking of the wing section 107-1 relative to a nominal or home position. Each of the actuators may be connected via electrical lines or wirelessly (not shown) to an aerial vehicle control system, a part thereof, or another component in communication with the aerial vehicle control system, in order to receive power and/or instructions or commands.

The one or more actuators may include one or more of a clutch, switch, bias element, servo, solenoid, screw actuator, geared actuator, linear actuator, rotary actuator, piezoelectric actuator, magnetic actuator, or various other types of actuators. In addition, the one or more actuators may be configured for one-time actuation, may be configured for one-way or two-way actuation, and/or may be configured for binary actuation between two different positions.

In example embodiments, various of the one or more actuators may be utilized to extend or retract a pin, key, or similar extending element into a hole, groove, keyhole, or similar receiving element to effect locking or unlocking of wing section 107-1, such as a spring-loaded actuator, a solenoid or servo, a screw actuator, a geared actuator (such as a rack and pinion arrangement), a magnetic actuator, a piezoelectric actuator, or other types of actuators. In addition, various types or combinations of magnetic and/or electromagnetic actuators may be utilized to create a magnetic locking and unlocking interface between wing section 107-1 and joint 108.

Although FIG. 6 shows a particular number, arrangement, and orientation of pivot axis 630 and locking element 635 with respect to wing section 107-1 and joint 108, in other embodiments, different numbers, arrangements, and/or orientations of a pivot axis and locking element may be included. For example, two or more locking elements may be included at an interface between a wing section 107-1 and joint 108, in which each locking element may lock the wing section 107-1 at a different pivoted or rotational position relative to joint 108. In addition, the relative positions or arrangements of the pivot axis and locking element may be modified from that shown in FIG. 6. Moreover, the locking element may be incorporated into the pivot axis, e.g., a pin or key may extend from a shaft associated with the pivot axis to lock or unlock the wing section 107-1, or one or more magnetic or frictional elements may be incorporated into a shaft associated with the pivot axis to lock or unlock the wing section 107-1.

Moreover, the one or more locking elements 635 may lock a wing section 107-1 in one or more pivoted or rotational positions to achieve one or more additional purposes. For example, the wing section 107-1 may be locked in a pivoted or rotational position to increase or maximize protection afforded by the wing section 107-1 from a propulsion mechanism or other component of the aerial vehicle. In addition, the wing section 107-1 may be locked in a pivoted or rotational position to increase air resistance, e.g., to act as an air brake, to slow or stop the aerial vehicle. Further, the wing section 107-1 may be locked in a pivoted or rotational position to modify or adjust one or more other aspects or characteristics of the aerial vehicle, including aspects related to safety, flight dynamics, stability, control, or other characteristics.

Figure 7:
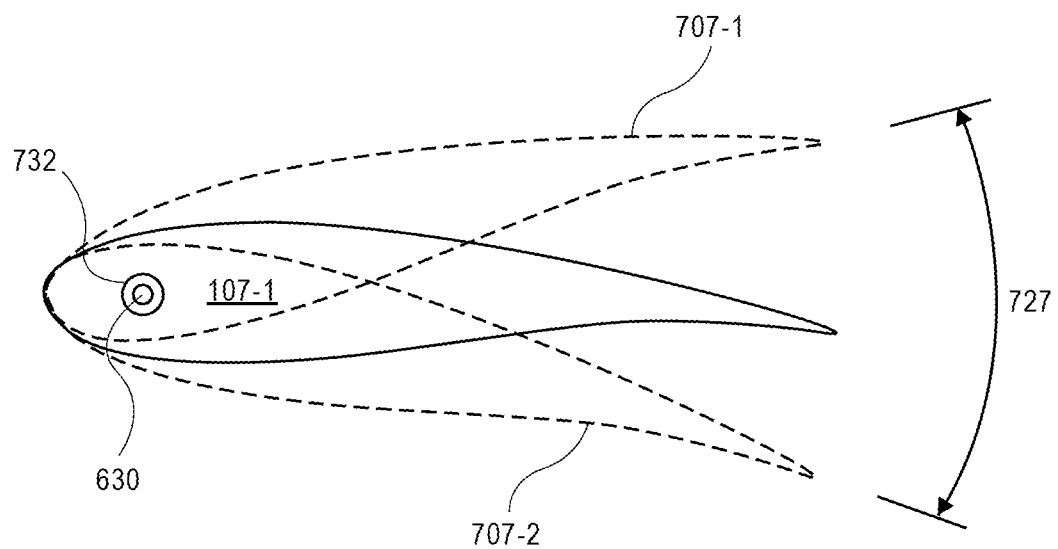
FIG. 7 illustrates a schematic, cross-sectional view of a pivoting wing section, in accordance with disclosed implementations.

FIG. 7 illustrates a schematic, cross-sectional view of a pivoting wing section 107-1, in accordance with disclosed implementations.

As shown in FIG. 7, the pivoting wing section 107-1 may be configured to pivot or rotate about pivot axis 630. The pivot axis 630 may comprise a shaft, pin, or other element that facilitates pivoting or rotation of the wing section 107-1 relative to a nominal or home position. The shaft or pin associated with pivot axis 630 may extend substantially parallel to a span of the wing section 107-1, and the shaft or pin may extend all or only a portion of the span of the wing section 107-1. Further, one or more bearings, rollers, lubricants, or other rotational elements may be associated with the shaft or pin at the pivot axis 630 to facilitate pivoting or rotation of the wing section 107-1.

In addition, the wing section 107-1 may be configured to pivot over an arc of travel 727 between opposing, fully rotated positions 707-1, 707-2. In some example embodiments, the fully rotated positions 707-1, 707-2 may define ends of travel or rotation of the wing section 107-1, and the ends of travel or rotation may be defined by mechanical or physical stops, which may be integrated into the pivot axis 630 or an interface between the wing section 107-1 and joint 108. In other example embodiments, the available arc of travel 727 of the wing section 107-1 may not have any limits, such that the wing section 107-1 may rotate completely around the pivot axis 630, in one or both rotational directions.

In example embodiments, the wing section 107-1 may be allowed to freely pivot or rotate based at least in part on airflow around the wing section 107-1. For example, depending upon environmental factors, such as wind, gusts, temperature, pressure, or others, as well as operational parameters of the aerial vehicle, the wing section 107-1 may freely pivot or rotate to any position. Generally, a freely pivoting wing section 107-1 may rotate to a position that may generate the least air resistance or drag on the aerial vehicle, while also reducing vibrations or forces that are transferred to other parts or components of the aerial vehicle via the wing section 107-1.

In other example embodiments, the wing section 107-1 may be allowed to freely pivot or rotate based at least in part on airflow around the wing section 107-1, and the wing section 107-1 may also include one or more bias elements or dampening elements 732. For example, a bias element 732 may be incorporated into a shaft or pin associated with the pivot axis 630, e.g., a torsional spring element, or may be included at an interface between the wing section 107-1 and joint 108, such that the wing section 107-1 may be biased toward a nominal or home position, even in the absence of a locking element 635 as described herein. Alternatively, the bias element 732 may cooperate with a locking element 635 to facilitate locking or unlocking of the wing section 107-1 relative to a nominal or home position. Alternatively or in addition, a dampening element 732 may be incorporated into a shaft or pin associated with the pivot axis 630, or may be included at an interface between the wing section 107-1 and joint 108, such that pivoting or rotation of the wing section 107-1 may be slowed, dampened, or otherwise controlled, thereby preventing continuous or rapid oscillation or vibrations of the wing section 107-1. In further example embodiments, one or more bias elements and dampening elements 732 may be provided together to further control pivoting or rotation of the wing section 107-1 relative to a nominal or home position.

Although FIG. 7 shows a particular number, arrangement, and orientation of bias elements and dampening elements 732 with respect to wing section 107-1 and joint 108, in other embodiments, different numbers, arrangements, and/or orientations of bias elements and/or dampening elements may be included. For example, two or more bias elements or dampening elements may be incorporated along pivot axis or included at an interface between a wing section 107-1 and joint 108.

In further example embodiments, as further described herein, the wing section 107-1 may include one or more actuators, and the wing section 107-1 may be actuated to pivot or rotate based at least in part on airflow around the wing section 107-1. For example, one or more actuators may be included, incorporated, or associated with the wing section 107-1 and/or joint 108. In addition, the one or more actuators may cooperate with a locking element 635 to facilitate locking or unlocking of the wing section 107-1 relative to a nominal or home position. Further, the one or more actuators may also cooperate with bias elements and/or dampening elements 732 to further control pivoting or rotation of the wing section 107-1 relative to a nominal or home position and/or to prevent continuous or rapid oscillation or vibrations of the wing section 107-1.

Figure 8A:
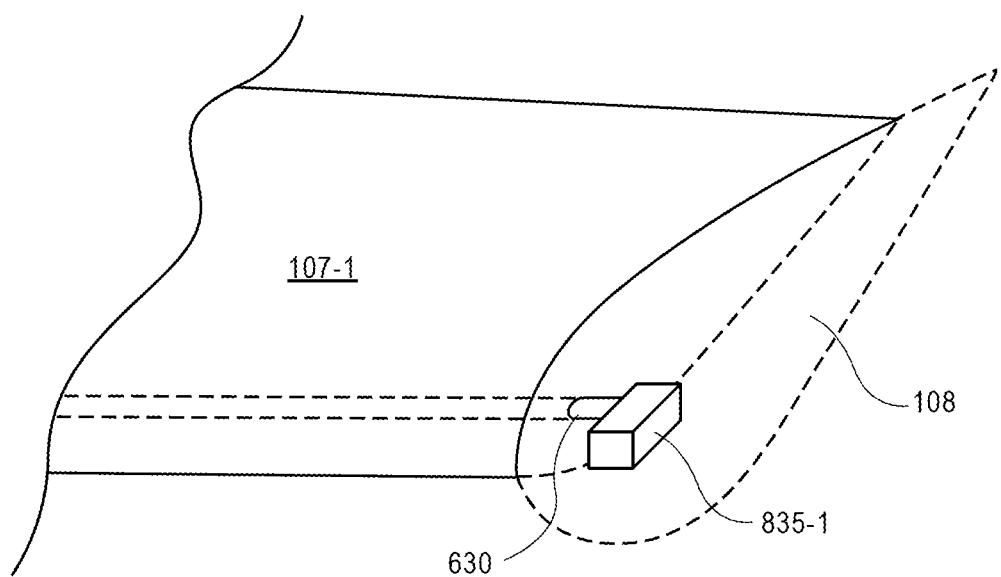
FIG. 8A illustrates a schematic, partial view of a pivoting wing section and a first example actuator, in accordance with disclosed implementations.

FIG. 8A illustrates a schematic, partial view of a pivoting wing section 107-1 and a first example actuator, in accordance with disclosed implementations.

As shown in FIG. 8A, the pivoting wing section 107-1 may be configured to pivot or rotate about pivot axis 630. The pivot axis 630 may comprise a shaft, pin, or other element that facilitates pivoting or rotation of the wing section 107-1 relative to a nominal or home position. The shaft or pin associated with pivot axis 630 may extend substantially parallel to a span of the wing section 107-1, and the shaft or pin may extend all or only a portion of the span of the wing section 107-1.

In addition, the wing section 107-1 may be associated with an actuator 835-1 that is directly coupled to the wing section 107-1, e.g., via a shaft, pin, or other element associated with the pivot axis 630. By the direct coupling, pivoting or rotation of the actuator 835-1 may cause corresponding pivoting or rotation of the wing section 107-1. The actuator 835-1 may be connected via electrical lines or wirelessly (not shown) to an aerial vehicle control system, a part thereof, or another component in communication with the aerial vehicle control system, in order to receive power and/or instructions or commands.

In example embodiments, the actuator 835-1 may comprise a clutch, switch, servo, solenoid, motor, rotary actuator, or other types of actuators. For example, an actuator 835-1 comprising a clutch, switch, or solenoid may pivot or rotate the wing section 107-1 between two different positions or orientations. In addition, an actuator 835-1 comprising a servo, motor, or rotary actuator may be able to pivot or rotate the wing section 107-1 between a plurality of different positions or orientations.

Figure 8B:
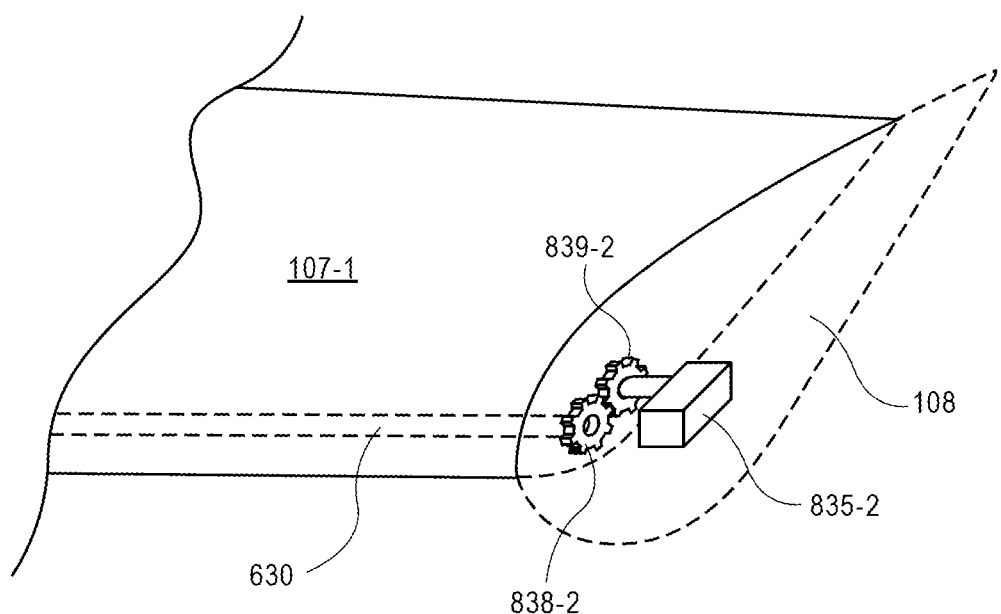
FIG. 8B illustrates a schematic, partial view of a pivoting wing section and a second example actuator, in accordance with disclosed implementations.

FIG. 8B illustrates a schematic, partial view of a pivoting wing section 107-1 and a second example actuator, in accordance with disclosed implementations.

As shown in FIG. 8B, the pivoting wing section 107-1 may be configured to pivot or rotate about pivot axis 630. The pivot axis 630 may comprise a shaft, pin, or other element that facilitates pivoting or rotation of the wing section 107-1 relative to a nominal or home position. The shaft or pin associated with pivot axis 630 may extend substantially parallel to a span of the wing section 107-1, and the shaft or pin may extend all or only a portion of the span of the wing section 107-1.

In addition, the wing section 107-1 may be associated with an actuator 835-2 that is coupled to the wing section 107-1 via a gear assembly, e.g., gears 838-2 and 839-2 connected to a shaft, pin, or other element associated with the pivot axis 630. By the gear assembly, movement, pivoting, or rotation of the actuator 835-2 may cause corresponding pivoting or rotation of the wing section 107-1. The actuator 835-2 may be connected via electrical lines or wirelessly (not shown) to an aerial vehicle control system, a part thereof, or another component in communication with the aerial vehicle control system, in order to receive power and/or instructions or commands.

In example embodiments, the actuator 835-2 may comprise a clutch, switch, servo, solenoid, motor, rotary actuator, linear actuator, screw actuator, geared actuator, or other types of actuators. For example, an actuator 835-2 comprising a clutch, switch, or solenoid connected to a gear assembly may pivot or rotate the wing section 107-1 between two different positions or orientations. In addition, an actuator 835-2 comprising a servo, motor, rotary actuator, linear actuator, screw actuator, or geared actuator connected to a gear assembly may be able to pivot or rotate the wing section 107-1 between a plurality of different positions or orientations. Further, although FIG. 8B illustrates a particular gear assembly including two spur gears, various other types, numbers, and arrangements of gears may also be used in a gear assembly, such as bevel gears, spiral gears, worm gears, herringbone gears, rack and pinion gear arrangements, other gear types or assemblies, or combinations thereof.

Figure 8C:
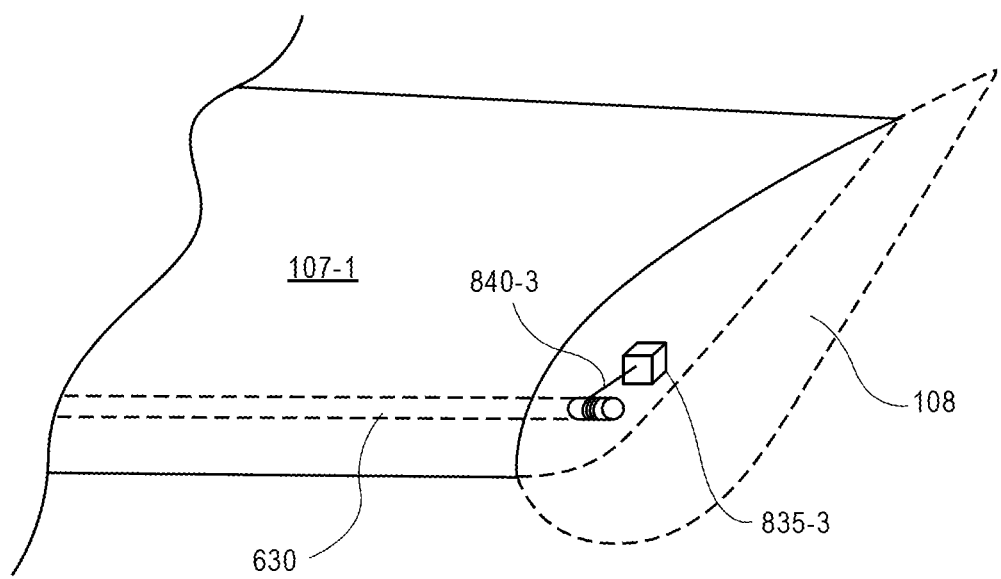
FIG. 8C illustrates a schematic, partial view of a pivoting wing section and a third example actuator, in accordance with disclosed implementations.

FIG. 8C illustrates a schematic, partial view of a pivoting wing section 107-1 and a third example actuator, in accordance with disclosed implementations.

As shown in FIG. 8C, the pivoting wing section 107-1 may be configured to pivot or rotate about pivot axis 630. The pivot axis 630 may comprise a shaft, pin, or other element that facilitates pivoting or rotation of the wing section 107-1 relative to a nominal or home position. The shaft or pin associated with pivot axis 630 may extend substantially parallel to a span of the wing section 107-1, and the shaft or pin may extend all or only a portion of the span of the wing section 107-1.

In addition, the wing section 107-1 may be associated with an actuator 835-3 that is coupled to the wing section 107-1 via a pulley assembly 840-3, e.g., a rope, string, wire, filament, or other similar element, connected to a shaft, pin, or other element associated with the pivot axis 630. By the pulley assembly, movement, pivoting, or rotation of the actuator 835-3 may cause corresponding pivoting or rotation of the wing section 107-1. The actuator 835-3 may be connected via electrical lines or wirelessly (not shown) to an aerial vehicle control system, a part thereof, or another component in communication with the aerial vehicle control system, in order to receive power and/or instructions or commands.

In example embodiments, the actuator 835-3 may comprise a clutch, switch, servo, solenoid, motor, rotary actuator, linear actuator, screw actuator, geared actuator, or other types of actuators. For example, an actuator 835-3 comprising a clutch, switch, or solenoid connected to a pulley assembly may pivot or rotate the wing section 107-1 between two different positions or orientations. In addition, an actuator 835-3 comprising a servo, motor, rotary actuator, linear actuator, screw actuator, or geared actuator connected to a pulley assembly may be able to pivot or rotate the wing section 107-1 between a plurality of different positions or orientations. Further, although FIG. 8C illustrates a particular pulley assembly including one pulley rope, string, wire, filament, or other similar element, various other types, numbers, and arrangements of pulley assemblies may also be used, such as pulleys used in combination with bias elements, two-way or bidirectional pulleys, a plurality of pulleys, two or more pulleys in different arrangements or orientations, or combinations thereof.

Further, the one or more actuators 835 may rotate a wing section 107-1 to one or more pivoted or rotational positions to achieve one or more additional purposes. For example, the wing section 107-1 may be rotated to a pivoted or rotational position to increase or maximize protection afforded by the wing section 107-1 from a propulsion mechanism or other component of the aerial vehicle. In addition, the wing section 107-1 may be rotated to a pivoted or rotational position to increase air resistance, e.g., to act as an air brake, to slow or stop the aerial vehicle. Further, the wing section 107-1 may be rotated to a pivoted or rotational position to modify or adjust one or more other aspects or characteristics of the aerial vehicle, including aspects related to safety, flight dynamics, stability, control, or other characteristics.

Although FIGS. 6-8C are described with reference to one wing section 107-1, it is understood that any and all features, elements, and variations described herein with reference to wing section 107-1 may also be incorporated into one or more other wing sections 107-2, 107-3, 107-4, 107-5, 107-6. In addition, the features, elements, and variations described herein individually with respect to each of FIGS. 6-8C may be combined in various combinations. Moreover, in further example embodiments that do not include joints 108 between wing sections, one or more of the various features, elements, and variations described herein, e.g., locking elements, bias elements, dampening elements, or actuators, may be incorporated into one or more portions of the wing sections, static or non-rotating portions of wing sections, adjacent wing sections, or any other components of the aerial vehicle that interface with the wing sections.

Figure 9:
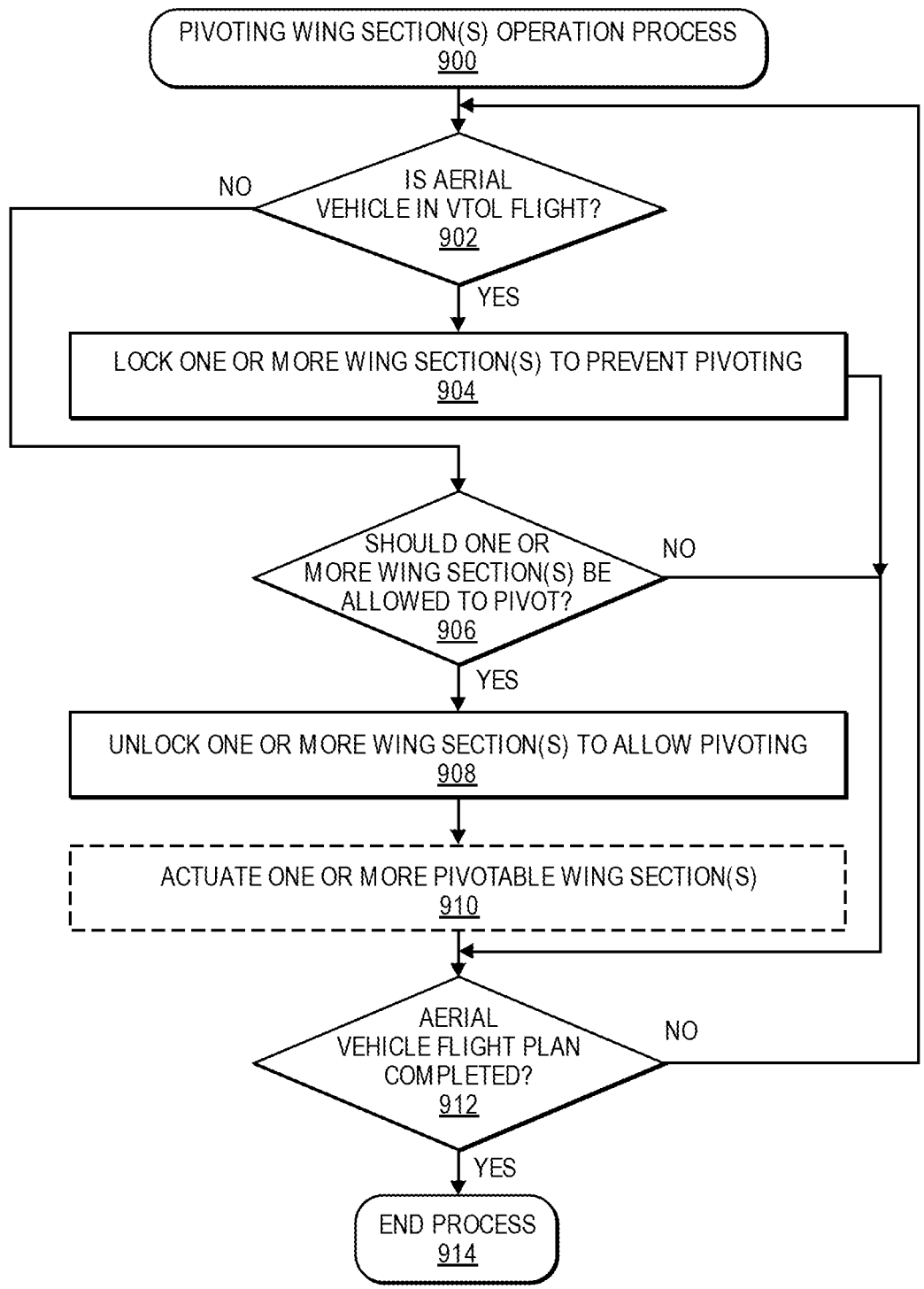
FIG. 9 is a flow diagram illustrating an example pivoting wing section(s) operation process, in accordance with disclosed implementations.

FIG. 9 is a flow diagram illustrating an example pivoting wing section(s) operation process 900, according to an implementation.

The process 900 may begin by determining whether the aerial vehicle is currently in VTOL flight, as at 902. For example, VTOL flight may be synonymous with navigation of the aerial vehicle in a substantially vertical orientation, as described with reference to FIG. 2. This may be determined based on data associated with the flight controller and/or one or more motor controllers. In addition, this may be determined based on a flight plan of the aerial vehicle. Further, this may be determined based on data associated with one or more sensors, such as an inertial measurement unit, accelerometers, and/or gyroscopes.

If it is determined that the aerial vehicle is currently in VTOL flight, as at 902, then the process 900 may proceed to lock one or more wing sections to prevent pivoting, as at 904. For example, in a substantially vertical orientation for VTOL flight, pivoting of wing sections may not be needed. Instead, it may be desirable to maintain the wing sections in fixed positions, e.g., nominal or home positions. Thus, in example embodiments in which one or more wing sections are associated with locking elements to maintain the wing sections relative to nominal or home positions, the locking elements may be actuated to hold the wing sections and prevent pivoting. This may maintain or improve stability and/or controllability of the aerial vehicle in VTOL flight. Moreover, as described herein, one or more wing sections may be rotated and/or locked in one or more pivoted or rotational positions to achieve one or more additional purposes, such as modifying or adjusting one or more aspects related to safety, flight dynamics, stability, control, or other characteristics.

If, however, it is determined that the aerial vehicle is not currently in VTOL flight, as at 902, then the process 900 may continue to determine whether one or more wing sections should be allowed to pivot, as at 906. For example, the aerial vehicle may be in a substantially horizontal orientation for navigation in a substantially horizontal direction, as described with reference to FIGS. 1 and 3-5. In the substantially horizontal orientation, pivoting of one or more wing sections may reduce vibrations and forces transferred to parts of the aerial vehicle via the wing sections, and/or may prevent stall or minimize turbulence experienced by the aerial vehicle. Moreover, pivoting of one or more wing sections may improve stability and controllability of the aerial vehicle, e.g., in response to wind gusts or other environmental factors, or in various flight or navigation scenarios.

In other example embodiments, alternatively or in addition to the determination related to vertical flight orientation or horizontal flight orientation of the aerial vehicle, the determination of whether to allow pivoting of one or more wing sections may also be based on various other factors. For example, environmental factors (e.g., wind, gusts, temperature, pressure, precipitation, or others), operating parameters of the aerial vehicle (e.g., speed, altitude, weight, power, range, vibration, flight plan, or others), location factors (e.g., urban, rural, densely populated, sparsely populated, potential obstacles, people, or objects, acceptable noise level, or others), and/or various other factors may also be analyzed or considered to determine whether to allow pivoting of one or more wing sections. Data associated with these various factors may be sensed or detected by various sensors, such as imaging sensors, audio sensors, temperature sensors, pressure sensors, inertial measurement units, accelerometers, gyroscopes, altimeters, location sensors, or other sensors, and analyzed to determine whether to allow pivoting of one or more wing sections, potentially in combination with stored data related to the various factors.

If it is determined that one or more wing sections should be allowed to pivot, as at 906, then the process 900 may proceed by unlocking one or more wing sections to allow pivoting, as at 908. As described herein, in example embodiments in which one or more wing sections are associated with locking elements to maintain the wing sections relative to nominal or home positions, the locking elements may be actuated to release the wing sections and allow pivoting. In response to releasing locking elements, the one or more wing sections may be allowed to freely pivot about respective pivot axes. In embodiments in which the one or more wing sections are associated with bias elements and/or dampening elements, the one or more wing sections may be allowed to freely pivot, and the bias elements and/or dampening elements may provide further control over the free pivoting of the wing sections as described herein.

In addition, for example embodiments in which the one or more wing sections are associated with one or more actuators, the process 900 may continue by actuating one or more pivotable wing sections, as at 910. In this manner, the wing sections may be actuated to desired pivoted or rotational positions or orientations using the one or more actuators. In addition, the desired pivoted or rotational positions or orientations may be determined based on various factors, such as environmental factors, operating parameters of the aerial vehicle, location factors, and/or various other factors, as described herein. Moreover, as described herein, one or more wing sections may be rotated and/or locked in one or more pivoted or rotational positions to achieve one or more additional purposes, such as modifying or adjusting one or more aspects related to safety, flight dynamics, stability, control, or other characteristics.

After locking one or more wing sections to prevent pivoting, as at 904, or in response to determining that one or more wing sections should not be allowed to pivot, as at 906, or after unlocking one or more wing sections to allow pivoting, as at 908, or after actuating one or more pivotable wing sections, as at 910, the process 900 may proceed to determine whether the aerial vehicle flight plan is completed, as at 912. If it is determined that the aerial vehicle flight plan is not completed, e.g., the aerial vehicle has not yet completed its mission or arrived at a destination location, the process 900 may return to step 902 and repeat the steps of process 900 during remaining portions of the aerial vehicle flight plan.

If, however, it is determined that the aerial vehicle flight plan is completed, e.g., the aerial has completed its mission or arrived at a destination location, then the process 900 may end, as at 914.

Figure 10:
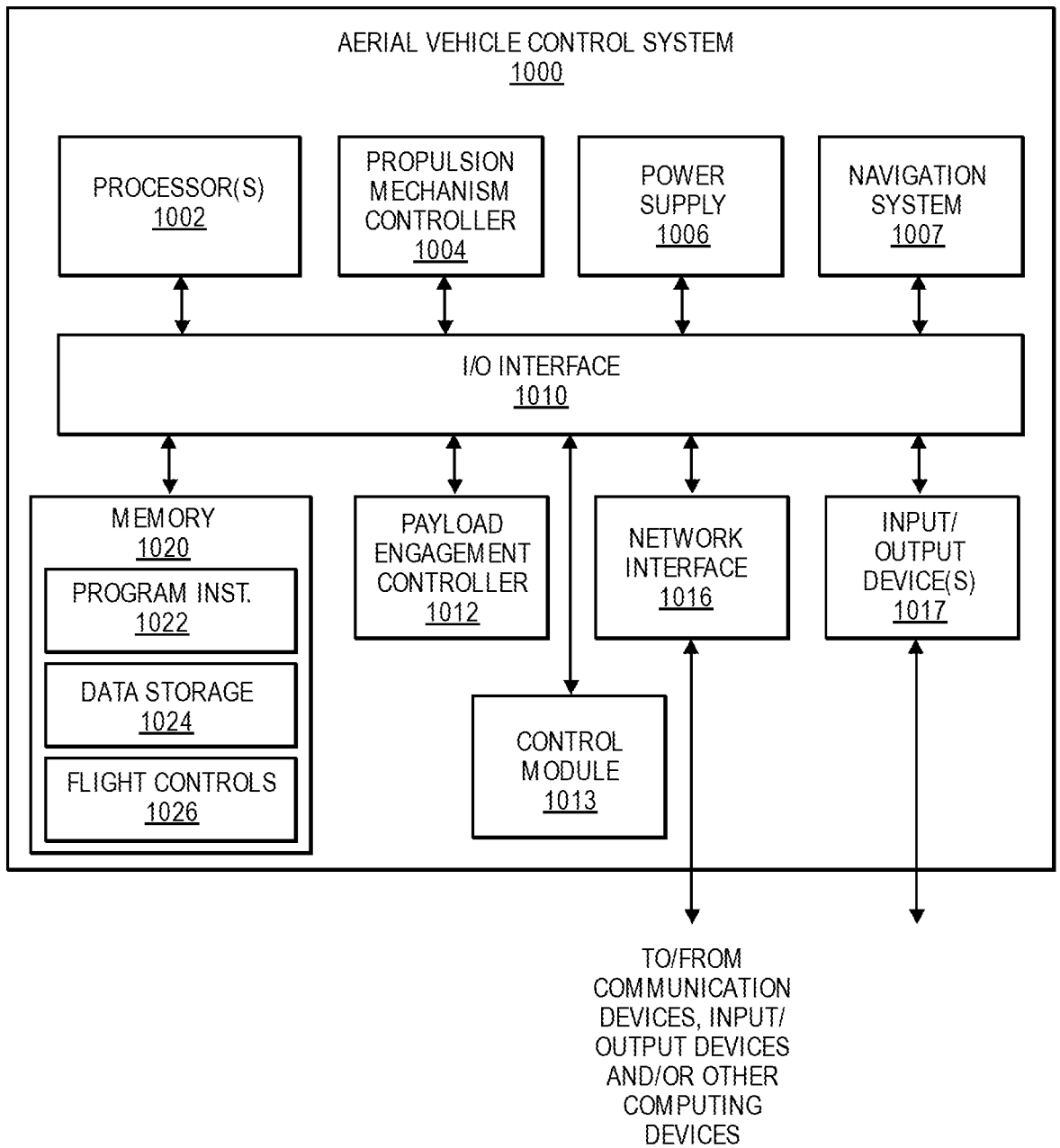
FIG. 10 is a block diagram illustrating various components of an example aerial vehicle control system, in accordance with disclosed implementations.

FIG. 10 is a block diagram illustrating various components of an example aerial vehicle control system 1000, in accordance with disclosed implementations.

In various examples, the block diagram may be illustrative of one or more aspects of the aerial vehicle control system 1000 that may be used to implement the various systems and methods discussed herein and/or to control operation of an aerial vehicle discussed herein. In the illustrated implementation, the aerial vehicle control system 1000 includes one or more processors 1002, coupled to a memory, e.g., a non-transitory computer readable storage medium 1020, via an input/output (I/O) interface 1010. The aerial vehicle control system 1000 also includes propulsion mechanism controllers 1004, such as electronic speed controls (ESCs) or motor controllers, power modules 1006 and/or a navigation system 1007. The aerial vehicle control system 1000 further includes a payload engagement controller 1012, a control module 1013 configured to control functions and operations related to pivoting wing sections described herein, a network interface 1016, and one or more input/output devices 1017.

In various implementations, the aerial vehicle control system 1000 may be a uniprocessor system including one processor 1002, or a multiprocessor system including several processors 1002 (e.g., two, four, eight, or another suitable number). The processor(s) 1002 may be any suitable processor capable of executing instructions. For example, in various implementations, the processor(s) 1002 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1002 may commonly, but not necessarily, implement the same ISA.

The non-transitory computer readable storage medium 1020 may be configured to store executable instructions, data, flight paths, flight control parameters, center of gravity information, and/or data items accessible by the processor(s) 1002. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1020 as program instructions 1022, data storage 1024 and flight controls 1026, respectively. In other implementations, program instructions, data, and/or flight controls may be received, sent, or stored upon different types of computer-accessible media, such as non-transitory media, or on similar media separate from the non-transitory computer readable storage medium 1020 or the aerial vehicle control system 1000. Generally speaking, a non-transitory, computer readable storage medium may include storage media or memory media such as magnetic or optical media, e.g., disk or CD/DVD-ROM, coupled to the aerial vehicle control system 1000 via the I/O interface 1010. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1016.

In one implementation, the I/O interface 1010 may be configured to coordinate I/O traffic between the processor(s) 1002, the non-transitory computer readable storage medium 1020, and any peripheral devices, the network interface or other peripheral interfaces, such as input/output devices 1017. In some implementations, the I/O interface 1010 may perform any necessary protocol, timing or other data transformations to convert data signals from one component (e.g., non-transitory computer readable storage medium 1020) into a format suitable for use by another component (e.g., processor(s) 1002). In some implementations, the I/O interface 1010 may include support for devices attached through various types of peripheral buses, such as a variant of the Peripheral Component Interconnect (PCI) bus standard or the Universal Serial Bus (USB) standard, for example. In some implementations, the function of the I/O interface 1010 may be split into two or more separate components, such as a north bridge and a south bridge, for example. Also, in some implementations, some or all of the functionality of the I/O interface 1010, such as an interface to the non-transitory computer readable storage medium 1020, may be incorporated directly into the processor(s) 1002.

The propulsion mechanism controllers 1004 may communicate with the navigation system 1007 and adjust the rotational speed, position, orientation, or other parameters of each propulsion mechanism to implement one or more aerial vehicle flight plans or operations, to stabilize the aerial vehicle, and/or to perform one or more maneuvers and guide the aerial vehicle along a flight path and/or to a destination location.

The navigation system 1007 may include a global positioning system (GPS), indoor positioning system (IPS), or other similar system and/or sensors that can be used to navigate the aerial vehicle to and/or from a location. The payload engagement controller 1012 communicates with the actuator(s) or motor(s) (e.g., a servo motor) used to engage and/or disengage items.

The control module 1013 may comprise or form a part of a flight controller that is configured to control functions or operations related to pivoting wing sections described herein, such as determining whether to allow pivoting of one or more wing sections, unlocking one or more wing sections, locking one or more wing sections, and/or actuating one or more wing sections, or other functions or operations related to pivoting wing sections of the aerial vehicle. Further, the control module 1013 may also be configured to control wingborn or horizontal flight of the aerial vehicle, VTOL flight of the aerial vehicle, and transitions between wingborn and VTOL flight orientations of the aerial vehicle. The control module 1013 may send and/or receive data to/from one or more sensors, such as imaging devices, an inertial measurement unit, accelerometers, gyroscopes, navigation sensors, or other sensors, and/or the control module 1013 may send and/or receive data to/from propulsion mechanism controllers 1004 associated with respective propulsion mechanisms. In some example embodiments, the control module 1013 may be integrated with or form a part of one or more of the processors 1002, the propulsion mechanism controllers 1004, and/or the navigation system 1007.

The network interface 1016 may be configured to allow data to be exchanged between the aerial vehicle control system 1000, other devices attached to a network, such as other computer systems (e.g., remote computing resources), and/or with aerial vehicle control systems of other aerial vehicles. For example, the network interface 1016 may enable wireless communication between the aerial vehicle and an aerial vehicle control system that is implemented on one or more remote computing resources. For wireless communication, an antenna of the aerial vehicle or other communication components may be utilized. As another example, the network interface 1016 may enable wireless communication between numerous aerial vehicles. In various implementations, the network interface 1016 may support communication via wireless general data networks, such as a Wi-Fi network. For example, the network interface 1016 may support communication via telecommunications networks, such as cellular communication networks, satellite networks, and the like.

Input/output devices 1017 may, in some implementations, include one or more displays, imaging devices, thermal sensors, infrared sensors, time of flight sensors, accelerometers, pressure sensors, weather sensors, etc. Multiple input/output devices 1017 may be present and controlled by the aerial vehicle control system 1000. One or more of these sensors may be utilized to control functions or operations related to pivoting wing sections described herein, as well as to control wingborn or VTOL flight, effect transitions between wingborn and VTOL configurations, and/or any other operations or functions described herein.

As shown in FIG. 10, the memory may include program instructions 1022, which may be configured to implement the example routines and/or sub-routines described herein. The data storage 1024 may include various data stores for maintaining data items that may be provided for pivoting wing sections, determining flight paths, landing, identifying locations for disengaging items, determining which propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1000 is merely illustrative and is not intended to limit the scope of the present disclosure. In particular, the computing system and devices may include any combination of hardware or software that can perform the indicated functions. The aerial vehicle control system 1000 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1000. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1000 may be transmitted to the aerial vehicle control system 1000 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle, comprising:
    a fuselage;
    six motor arms coupled to and extending from the fuselage;
    six motors, each motor coupled to a respective motor arm and positioned around the fuselage;
    six propellers, each propeller coupled to and rotated by a respective motor; and
    a ring wing coupled to outer ends of the six motor arms and positioned around the fuselage, the six motors, and the six propellers, the ring wing comprising six wing sections;
    wherein at least one wing section of the six wing sections is pivotably coupled to adjacent wing sections; and
    wherein the at least one wing section is freely pivotable about a pivot axis based at least in part on airflow around the at least one wing section.

2. The aerial vehicle of claim 1, further comprising:
    a locking element associated with the at least one wing section, the locking element configured to at least one of hold or release the at least one wing section relative to a nominal position.

3. The aerial vehicle of claim 1, further comprising:
    an actuator associated with the at least one wing section, the actuator configured to modify an orientation of the at least one wing section.

4. The aerial vehicle of claim 1, wherein a plurality of wing sections of the six wing sections are pivotably coupled to adjacent wing sections.

5. An aerial vehicle, comprising:
    a fuselage;
    at least one propulsion mechanism coupled to the fuselage and configured to provide thrust to the aerial vehicle; and
    a ring wing positioned around the fuselage and the at least one propulsion mechanism;
    wherein the ring wing includes at least one wing section that is pivotable relative to a remainder of the ring wing; and
    wherein the at least one wing section is freely pivotable based at least in part on airflow around the at least one wing section.

6. The aerial vehicle of claim 5, wherein the at least one wing section pivots around a pivot axis extending substantially parallel to a span of the at least one wing section.

7. The aerial vehicle of claim 5, further comprising:
    a locking element associated with the at least one wing section, the locking element configured to at least one of hold or release the at least one wing section relative to a nominal position.

8. The aerial vehicle of claim 7, wherein the locking element comprises at least one of a clutch, switch, bias element, servo, solenoid, linear actuator, rotary actuator, piezoelectric actuator, or magnetic actuator.

9. The aerial vehicle of claim 5, further comprising:
    a bias element associated with the at least one wing section, the bias element configured to bias the at least one wing section toward a nominal position.

10. The aerial vehicle of claim 5, further comprising:
    a dampening element associated with the at least one wing section, the dampening element configured to dampen a pivoting of the at least one wing section.

11. The aerial vehicle of claim 5, further comprising:
    an actuator associated with the at least one wing section, the actuator configured to modify an orientation of the at least one wing section.

12. The aerial vehicle of claim 11, wherein the actuator comprises at least one of a servo, solenoid, motor, screw actuator, geared actuator, magnetic actuator, linear actuator, or rotary actuator.

13. The aerial vehicle of claim 5, wherein the ring wing is a hexagonal ring wing; and wherein the ring wing includes a plurality of wing sections that are pivotable relative to a remainder of the ring wing, the plurality of wing sections including the at least one wing section.

14. The aerial vehicle of claim 13, wherein a first wing section of the plurality of wing sections is an upper wing section in a horizontal flight orientation of the aerial vehicle; and wherein a second wing section of the plurality of wing sections is a lower wing section in the horizontal flight orientation of the aerial vehicle.

15. A method to operate an aerial vehicle, comprising:

operating the aerial vehicle in a horizontal flight orientation, the aerial vehicle comprising a ring wing positioned around a fuselage and at least one propulsion mechanism of the aerial vehicle; and pivoting at least one wing section of the ring wing based at least in part on airflow around the at least one wing section;

wherein the at least one wing section is freely pivotable based at least in part on airflow around the at least one wing section.

16. The method of claim 15, further comprising:

determining that the aerial vehicle is in the horizontal flight orientation; and in response to determining that the aerial vehicle is in the horizontal flight orientation, releasing, via a locking element, the at least one wing section to enable pivoting.

17. The method of claim 15, further comprising:

determining that the aerial vehicle is transitioning to a vertical flight orientation; and in response to determining that the aerial vehicle is transitioning to the vertical flight orientation, locking, via a locking element, the at least one wing section to prevent pivoting.

18. The method of claim 15, wherein pivoting the at least one wing section further comprises modifying, via an actuator, an orientation of the at least one wing section relative to a remainder of the ring wing.

* * * * *